(12) United States Patent
Wiedermann et al.

(10) Patent No.: US 8,141,917 B2
(45) Date of Patent: Mar. 27, 2012

(54) ENERGY ABSORPTION IMPACT SYSTEM FOR MOTOR VEHICLES

(75) Inventors: Holger Wiedermann, Munich (DE); Frank Seifert, Neuried (DE); Torsten Groning, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/798,043

(22) Filed: Mar. 29, 2010

(65) Prior Publication Data
US 2010/0253103 A1     Oct. 7, 2010

(30) Foreign Application Priority Data
Mar. 31, 2009 (DE) .................... 10 2009 015 182

(51) Int. Cl.
 *B60R 21/34* (2011.01)
(52) U.S. Cl. ....................... 293/133; 293/155
(58) Field of Classification Search .............. 293/109, 293/132, 20, 29, 133, 155; 296/187.02, 187.03, 296/187.04, 187.05
See application file for complete search history.

(56) References Cited

U.S. PATENT DOCUMENTS

| | | | | |
|---|---|---|---|---|
| 6,065,786 | A * | 5/2000 | Wheatley | 293/109 |
| 7,097,234 | B2 * | 8/2006 | Schonebeck | 296/187.03 |
| 2007/0278825 | A1 * | 12/2007 | Braunbeck et al. | 296/187.09 |

FOREIGN PATENT DOCUMENTS

| | | |
|---|---|---|
| DE | 3232940 C2 | 10/1985 |
| DE | 4413641 C1 | 6/1995 |
| DE | 4432082 A1 | 3/1996 |
| DE | 19810871 A1 | 9/1999 |
| DE | 69904140 T2 | 8/2003 |
| DE | 102004013370 A1 | 10/2005 |
| DE | 102005024094 A1 | 11/2006 |
| EP | 1564079 A1 | 9/2003 |
| EP | 1645476 A1 | 9/2005 |
| EP | 2078642 A1 | 2/2007 |
| GB | 951690 | 3/1964 |
| JP | 03284442 A | 12/1991 |
| JP | 04154457 A | 5/1992 |

* cited by examiner

*Primary Examiner* — Dennis Pedder
*Assistant Examiner* — Jason S Daniels
(74) *Attorney, Agent, or Firm* — Price Heneveld LLP

(57) ABSTRACT

A bumper system for motor vehicles includes an energy absorption assembly that extends generally perpendicular to the direction of vehicle travel and is connected with the longitudinal supports of the vehicle frame by crush boxes. The energy absorption assembly has first and second generally parallel bumper members, which support one another along first and second contact surfaces. The first bumper member is slideably supported by the second bumper member and is configured such that upon impact, the first bumper member is slidingly displaced along the first and second contact surfaces both horizontally relative to the longitudinal supports of the vehicle frame and vertically relative to the second bumper member.

11 Claims, 2 Drawing Sheets

ENERGY ABSORPTION IMPACT SYSTEM FOR MOTOR VEHICLES

CLAIM OF PRIORITY

Applicants hereby claim the priority benefits under the provisions of 35 U.S.C. §119, basing said claim of priority on German Patent Application Serial No. 10 200901582.6-21, filed Mar. 31, 2009. In accordance with the provisions of 35 U.S.C. §119 and Rule 55(b), a certified copy of the above-listed German patent application will be filed before grant of a patent.

BACKGROUND OF THE INVENTION

The invention relates to a bumper system for a motor vehicle.

The primary purpose of bumper systems is to absorb the impact when a motor vehicle strikes an obstacle, and to protect the vehicle body from structural damage during a low-speed collision. Bumper systems also protect pedestrians when they come into contact with a motor vehicle.

GB 951,690 provides a bumper system for a motor vehicle. The bumper system has an energy absorption element that extends perpendicular to the direction of travel and is connected to the vehicle frame. The energy absorption element has two parallel sub-elements that are supported on a support and on one another. These sub-elements are embodied as long shells that have a curved vertical cross-section. Both the sub-elements and the support for the sub-elements comprise plastic.

The support has projections along its upper and lower longitudinal edges. These projections oppose grooves on the adjacent inner sub-element. This sub-element itself possesses projections that face the support and that are disposed at intervals adjacent to the sides of the projections on the support that face one another. A free space is formed between the inner sub-element and the support because of the curved shape of the inner sub-element and the straight extension of the support between its projections.

Tapered upper and lower longitudinal edges of the sub-outer element that face away from the support are disposed on the convex surfaces of the inner sub-element. These convex surfaces face the outer sub-element and are also tapered at their ends. In addition, the outer sub-element has inner projections that oppose grooves on the inner sub-element.

The sub-elements and the support are held in the ready position by means of bolts. The bolts are integrally joined to the outer sub-element, pass through openings that are approximately centered in terms of height in the inner sub-element and in the support, and are secured in position by means of a transverse pin.

A free space is also provided between the outer sub-element and the inner sub-element.

If the motor vehicle comes into contact with an obstacle, the outer sub-element is displaced horizontally towards the support. The upper and lower longitudinal edges of the outer sub-element slide onto the convex sides of the inner sub-element towards its upper and lower longitudinal edges. The projections of the outer sub-element move into contact with the grooves of the inner sub-element, and the projections on the inner sub-element move into contact with the projections on the support. Because of this contact, the sides of the inner sub-element nest about the projections on the support so that these projections catch in the grooves adjacent to the projections on the inner sub-element.

The free space between the outer sub-element and the inner sub-element, and the free space between the inner sub-element and the support, are generally or largely maintained.

A prolonged impact force causes the vertical extension of the two sub-elements. The projections on the outer sub-element slide out of the grooves on the inner sub-element and over the upper and lower projection-like limits for the grooves on the inner sub-element. Since this force is transmitted onto the inner sub-element, the projections on the inner sub-element also slide over the projections on the support. Now, the free space between the outer sub-element and the inner sub-element disappears. The upper and lower sides of the outer sub-element detach again from the opposing upper and lower sides of the inner sub-element.

The stress on the vehicle frame is reduced due to the flexibility provided by the sub-elements.

The sub-elements can return to their original configuration when the force is gone.

A bumper system is known from DE 10 2005 024 094 A1. In it, a bumper cross-member has a hollow profile with at least two wings joined to one another via a bending site. In a collision, the wings pivot about the bending site with the goal of increasing the height of the bumper cross-member and reducing the depth.

An energy absorption element on the end-face of a support is known from EP 2 078 642 A1. It has two legs that are joined to one another via a predetermined breaking point. The legs are supported on the support on surfaces. When a force acts thereon, the legs slide upward and downward relatively along the support. That is, they open up and the predetermined breaking point breaks.

The energy absorption element in EP 1 564 079 A1 is provided with a profile that has a W-shaped vertical cross-section. This profile can extend vertically when an impact force acts on it.

A cross-member is known from JP 04 154 457 A. An energy absorption element made of foam is provided between it and a front cover. The cross-member is joined to crush boxes via connecting bars. When there is an impact, the energy absorption element deforms, the cross-member is displaced downward, and the connecting bars deform, as well.

In JP 03 284 442 A, an energy absorption element made of foam is fixed in a chamber that is circumferentially delimited by a sheet. When there is an impact, the energy absorption element is compressed, with the upper and lower edge sheets buckling upwardly and downwardly.

SUMMARY OF THE INVENTION

Proceeding from the prior art, the underlying object of the invention is to create a bumper system having improved shock absorbing behavior, especially with regard to protecting pedestrians.

In accordance with the invention this object is attained with the features of claim 1.

Components of claims 2 through 9 provide advantageous refinements of this basic inventive concept or thought.

One significant aspect of the present invention is that the sub-elements of the energy absorption element, which are coupled to longitudinal supports of the vehicle frame by supporting crush boxes, support one another along contact surfaces. Moreover, the first sub-element, which faces away from the longitudinal supports, can be displaced or shifted along the contact surfaces, both in a direction generally horizontal to the longitudinal supports, as well as in a direction generally vertical to the second sub-element, either upwardly or downwardly.

Thus, one basic underlying principle is to split or divide the impact energy from the leg of a pedestrian into horizontal and vertical components. The vertical deformation or movement component makes it possible to reduce the thickness of the energy absorption element in the longitudinal direction of the vehicle. Therefore, it leads to a reduction in the overhang of the bumper system.

The first sub-element of the energy absorption element selectively shifts or moves upwardly or downwardly, and horizontally relative to the second sub-element. However, upward displacement is preferably sought, because if there is contact with a vehicle, the pedestrian is also lifted upwardly. When the impact energy acts on the first sub-element, because of the horizontal and vertical shifting and/or deflection, this energy is divided or broken down by the sub-elements that support one another. Moreover, the energy absorption can be influenced by the size of the sub-elements, and thus of the resultant contact surface resistance force. The selection of the material, and the size of the sub-elements for the energy absorption element, as adapted to the associated crush box, are all parameters that can be modified for energy absorption.

The second sub-element can have a concave contact surface facing away from the crush boxes, while a convex contact surface of the first sub-element is slidingly supported on the concave contact surface of the second sub-element. However, it is also possible for there to be a concave contact surface on the first sub-element and a convex contact surface on the second sub-element. Furthermore, the two sub-elements have a linear surface contact.

The two-piece energy absorption element may be supported directly on the crush boxes. In this case, it is useful for the sub-elements to comprise a closed, foamed aluminum profile. However, it is also possible for the energy absorption element to be arranged in front of a stable cross-member that is joined to the crush boxes, and that is especially made of steel.

The sub-elements may comprise the same material, but may differ in density.

It is also possible for the sub-elements to comprise the same or different materials.

The materials may be foamed, for instance.

Furthermore, the contact surfaces for the sub-elements may comprise materials that are different from the material for the sub-elements, and may also be different from one another.

The sub-elements may be glued to one another in order to fix the sub-elements in the ready position.

However, they may also be clamped to one another.

Furthermore, it is possible for the sub-elements to interdigitate in the area of the contact surfaces.

Another embodiment provides that the sub-elements are joined to one another via at least one profile that bridges the contact surfaces. Such a profile should make it possible to join the two sub-elements. It should also make it possible for the sub-elements to support one another such that sliding motion and deformation occur simultaneously. Moreover, depending on the embodiment, the profile also provides the opportunity to introduce energy either as tensile force or compressive force in the energy absorption element itself, thus converting it to deformation energy.

The profile may be embodied for instance in a Z shape or in a U shape. Other sectional shapes are also possible.

The profile may comprise thin steel sheet, aluminum, plastic, or other suitable materials.

These and other advantages of the invention will be further understood and appreciated by those skilled in the art by reference to the following written specification, claims, and appended drawings.

The invention shall be explained in greater detail in the following using exemplary embodiments depicted in the drawings.

DETAILED DESCRIPTION OF THE PREFERRED EMBODIMENTS

Figure 1:
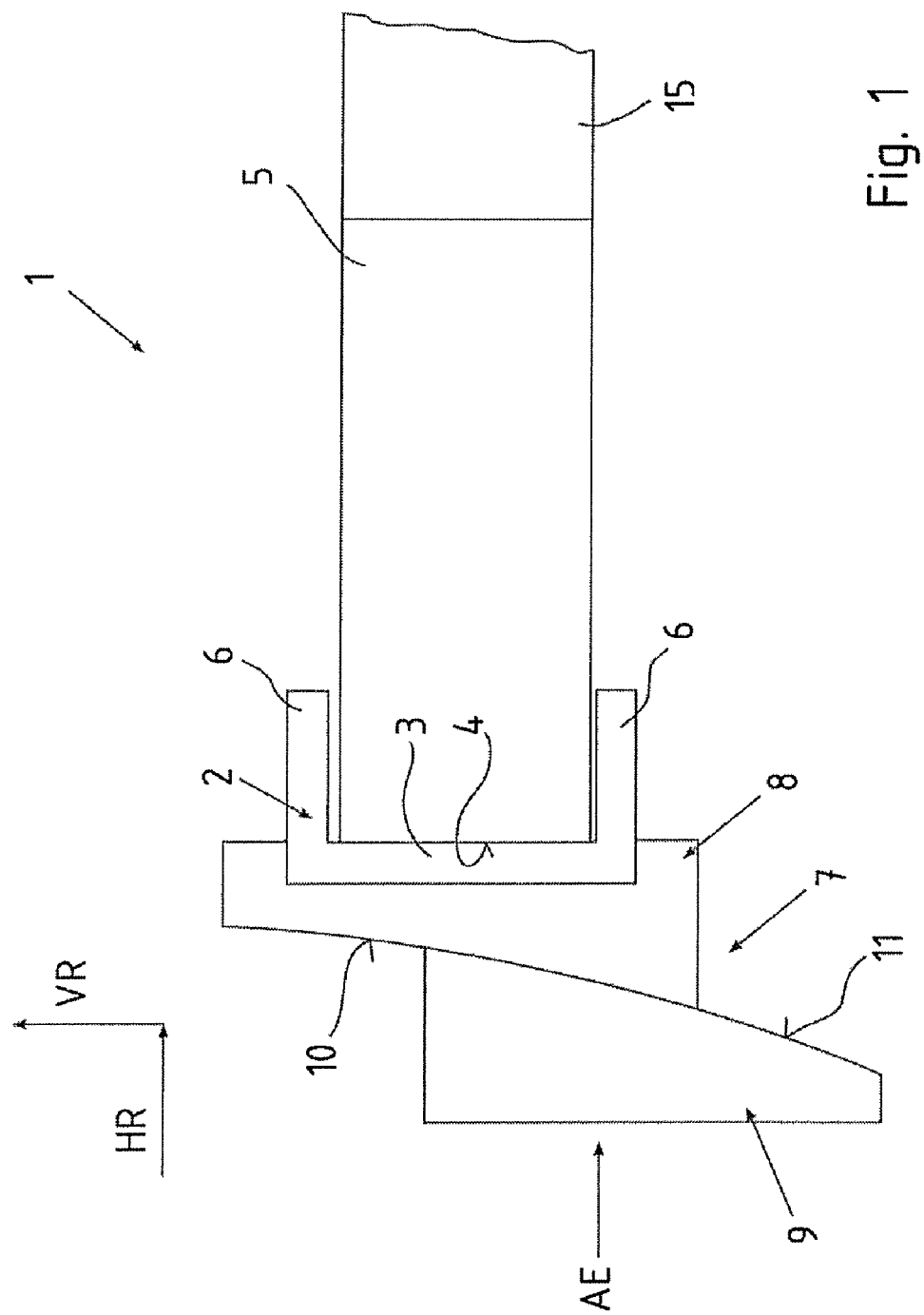
FIG. 1 depicts a schematic vertical cross-section of a bumper system for a motor vehicle, and FIGS. 2 through 4 also depict schematic vertical cross-sections of three additional embodiments of a bumper system for a motor vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A bumper system for a motor vehicle is labeled 1 in FIG. 1. The bumper system 1 includes a cross-member 2 that has a U-shaped cross-section. It is supported by its bar portion 3 at the end face 4 of a crush box 5, and its two leg portions 6 overlap the crush box 5. The crush box 5 is supported on a conventional longitudinal support portion 15 (FIG. 1) (not shown in greater detail) of the vehicle body.

An energy absorption element 7 embodying the present invention is disposed in front of the cross-member 2. It is divided into two sub-elements 8, 9 that run generally parallel to the cross-member 2, and support one another. The second sub-element 8 is rigidly joined to the cross-member 2 and has a concave contact surface 10 that faces away from the cross-member 2. The first sub-element 9 has a convex surface 11 that is supported on the concave surface 10 of the second sub-element 8. When the energy absorption element 7 is in the ready position depicted in FIG. 1, the first sub-element 9 is offset vertically downwardly relative to the second sub-element 8.

The structure of the bumper system 1 is designed such that the impact energy "AE," for instance from the leg of pedestrian, is broken up or divided by the two-piece energy absorption element 7 into both a horizontal component "HR" and a vertical component "VR." In the exemplary embodiment in FIG. 1, this bidirectional energy absorption is achieved because the convex contact surface 11 of the first sub-element 9 can selectively, frictionally slide along the concave contact surface 10 of the second sub-element 8, which is in turn joined to the cross-member 2. This sliding motion between contact surfaces 10 and 11 absorbs and dissipates the energy imparted to the two-piece energy absorption element 7 by the impact.

The two sub-elements 8, 9 may comprise the same material, for instance foamed plastic. However, other materials are also possible. Furthermore, the contact surfaces 10, 11 may comprise different materials in order to ensure optimum relative sliding motion.

In the ready position illustrated in FIG. 1, the first sub-element 9 can be clamped or glued to the second sub-element 8 in the region of the contact surfaces 10, 11. This non-fixed connection is released or severed when the impact energy "AE" is broken up or divided, wherein the first sub-element 9 selectively moves both horizontally "HR" and vertically "VR" on the second sub-element 8.

Figure 2:
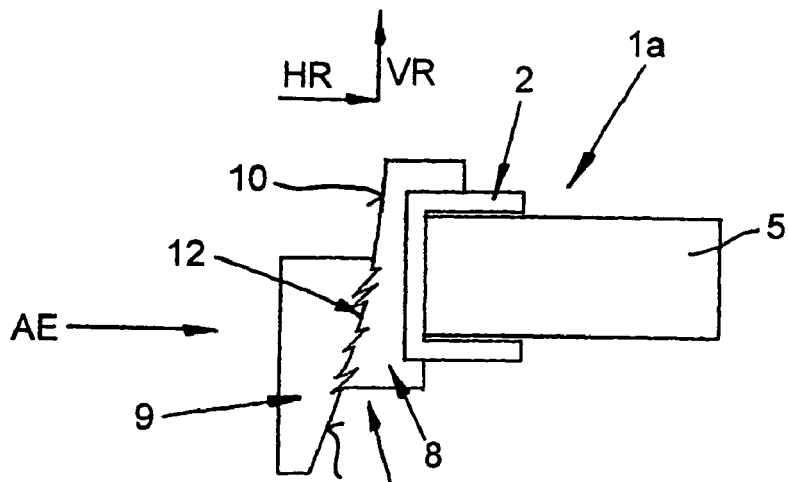

A bumper system embodiment 1a in accordance with FIG. 2 also provides a cross-member 2, a crush box 5, and an energy absorption element 7 made of two sub-elements 8, 9. It can be seen that in this embodiment, the first sub-element 9 and the second sub-element 8 are joined in the ready position by means of interlocking fingers or interdigitation 12 in the region of their contact surfaces 10, 11. The interdigitation 12 is released upon impact, and the contact surfaces 10, 11 can then selectively slide over one another, wherein the first sub-element 9 is displaced relative to the second sub-element 8. The impact energy "AE" is broken down or divided into the horizontal direction "HR" and the vertical direction "VR."

Figure 3:
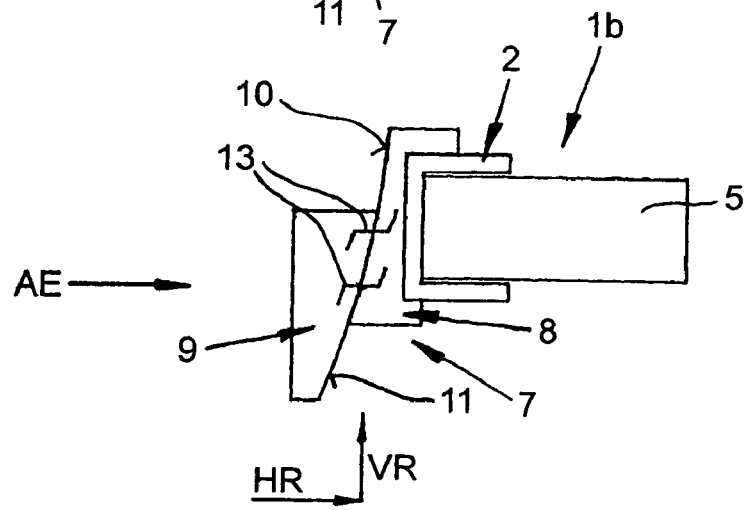

In the embodiment of a bumper system 1b shown in FIG. 3, the two sub-elements 8, 9 for the energy absorption element 7 are joined to one another via two Z profiles 13. These profiles 13 are made of steel, and bridge the contact surfaces 10, 11. Otherwise, the bumper system 1b corresponds to the embodiment shown in FIG. 1.

When the impact energy "AE" acts on bumper system 1b, the Z profiles 13 deform and the first sub-element 9 is displaced upwardly relative to the second sub-element 8. The impact energy "AE" is broken down or split by the energy absorption element 7 into a horizontal component "HR" and a vertical component "VR."

Figure 4:
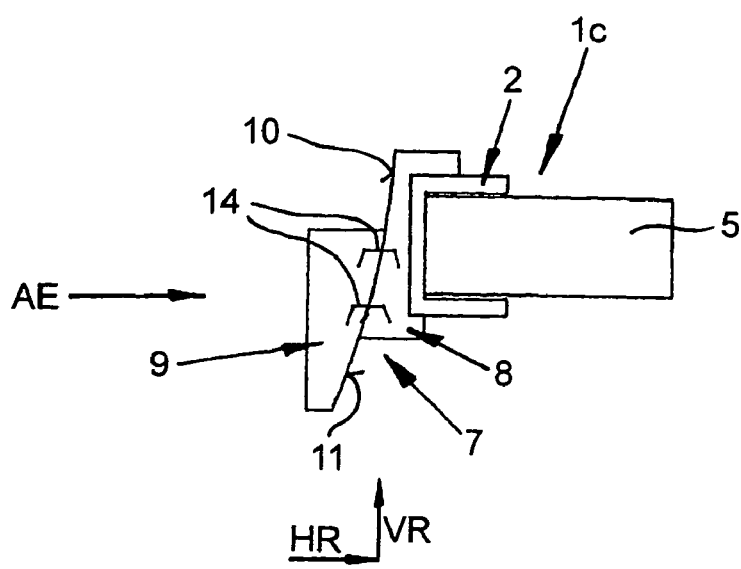

The bumper system 1c shown in FIG. 4 also provides two profiles 14 that bridge the contact surfaces 10, 11 of the two sub-elements 8, 9 of the energy absorption element 7. These profiles 14 have a U-shape or trapezoidal shape.

When an impact energy "AE" acts on bumper system 1c, the first sub-element 9 is displaced upwardly relative to the second sub-element 8, and the U profiles 14 deform. The impact energy "AE" is broken down or split by the two-piece energy absorption element 7 into a horizontal component or direction "HR" and a vertical component or direction "VR."

In the foregoing description, it will be readily appreciated by those skilled in the art that modifications may be made to the invention without departing from the concepts disclosed herein. Such modifications are to be considered as included in the following claims, unless these claims by their language expressly state otherwise.

LEGEND

1—Bumper system
1a—Bumper system
1b—Bumper system
1c—Bumper system
2—Cross-member
3—Bar for 2
4—End face for 5
5—Crush box
6—Leg for 2
7—Energy absorption element
8—Second sub-element
9—First sub-element
10—Contact surface for 8
11—Contact surface for 9
12—Interdigitation
13—Z profiles
14—U profiles
AE—Impact energy
HR—Horizontal direction
VR—Vertical direction

The invention claimed is:

1. A bumper system for motor vehicles and the like of the type having a vehicle frame with longitudinal supports, comprising:
an energy absorption assembly extending generally perpendicular to the direction of vehicle travel, connected with the longitudinal supports of the vehicle frame by crush boxes and having first and second generally parallel bumper members which support one another along first and second contact surfaces; and wherein
said second bumper member is fixedly supported by the vehicle frame, and includes said second contact surface which faces away from the vehicle frame; and
said first bumper member is slidingly supported by said second bumper member, and includes said first contact surface which faces toward the vehicle frame and matingly abuts with and is slideably supported on said second contact surface of said second bumper member for selective movement along said first and second contact surfaces relative to said second bumper member, whereby when said bumper system impacts an object, said first bumper member is slidingly and frictionally displaced along said first and second contact surfaces in both a horizontal rearward direction relative to the longitudinal supports of the vehicle frame and in a vertical upward direction relative to said second bumper member to achieve bidirectional energy absorption of the impact.

2. The bumper system as set forth in claim 1, wherein:
said second contact surface has a generally concave shape that opens outwardly along a substantially vertical plane and faces away from the vehicle frame; and
said first contact surface has a generally convex shape that protrudes inwardly along a substantially vertical plane, faces toward the vehicle frame, and matingly abuts with and is slidingly supported on said second contact surface of said second bumper member for selective arcuate movement along said first and second contact surfaces relative to said second bumper member.

3. The bumper system as set forth in claim 2, wherein:
said energy absorption assembly is disposed forwardly of a cross member portion of the vehicle frame relative to the direction of vehicle travel, which is in turn joined to the crush boxes.

4. The bumper system as set forth in claim 2, wherein:
said first and second bumper members are constructed from the same material, but have different densities.

5. The bumper system as set forth in claim 2, wherein:
said first and second bumper members are constructed from different materials.

6. The bumper system as set forth in claim 2, wherein:
said first bumper member is constructed from a first material;
said second bumper member is constructed from a second material which is different from said first material;
said first contact surface is constructed from a third material which is different from said first material; and
said second contact surface is constructed from a fourth material which is different from said second material.

7. The bumper system as set forth in claim 2, wherein:
said first and second contact surfaces are adhered to one another.

8. The bumper system as set forth in claim 2, wherein:
said first and second contact surfaces are clamped to one another in the area of said first and second contact surfaces.

9. The bumper system as set forth in claim 2, wherein:
said first and second bumper members interdigitate with one another in the area of said first and second contact surfaces.

10. The bumper system as set forth in claim 2, wherein:
said first and second bumper members are joined to one another by at least one profile which bridges said first and second contact surfaces.

11. A bumper system for motor vehicles and the like of the type having a vehicle frame with longitudinal supports, comprising:

an energy absorption assembly extending generally perpendicular to the direction of vehicle travel, connected with the longitudinal supports of the vehicle frame by crush boxes and having first and second generally parallel bumper members which support one another along first and second contact surfaces; and wherein said second bumper member is fixedly supported by the vehicle frame, and has said second contact surface thereof facing away from the vehicle frame and contacting said first contact surface of said first bumper member;

said first bumper member is slidingly supported by said second bumper member, and has said first contact surface thereof contacting said second contact surface of said second bumper member and configured such that upon impact, said first bumper member is slidingly displaced along said first and second contact surfaces both horizontally relative to the longitudinal supports of the vehicle frame and vertically relative to said second bumper member; and wherein said first and second bumper members are constructed from the same materials, but have different densities.

* * * * *